United States Patent Office 3,575,845
Patented Apr. 20, 1971

3,575,845
SELECTIVE CATALYTIC CONVERSION
Joseph N. Miale, Trenton, N.J., assignor to
Mobil Oil Corporation
No Drawing. Continuation-in-part of abandoned application Ser. No. 143,067, Oct. 5, 1961. This application Dec. 13, 1965, Ser. No. 513,606
Int. Cl. C10g 13/02
U.S. Cl. 208—111                    19 Claims

ABSTRACT OF THE DISCLOSURE

A chemical reaction is conducted selectively whereby a porous solid catalyst whose external exposed surface has been poisoned with an organic phosphorous compound is utilized such that only reactant molecules whose size and shape permit entry to the interior of the catalyst are converted.

---

This application is a continuation-in-part of copending application Ser. No. 143,067, filed Oct. 5, 1961, now abandoned.

This invention relates to a novel method for conducting catalytic conversion processes with specific and unusual selectivity towards certain reaction paths, and for reacting certain specific compounds from a mixture of reactants.

More particularly, the present invention is directed to a method for selectively conducting chemical reactions by bringing a charge into contact with a porous solid having a highly ordered uniform structure characterized by interstitial dimensions such that only reactant or product molecules of suitable size and shape may be transported in either direction between the exterior phase and the interior phase, said porous solid having sites located within the interior thereof, the external exposed surfaces of said solid having been poisoned catalytically, before substantial conversion of said charge is encountered, by treatment with an organic phosphorous compound capable of inhibiting the catalytic activity thereof, and of such molecular size and shape as to be excluded from entering the pores and making contact with active catalytic sites on the interior of the solid.

In one embodiment, the invention described herein is concerned with a process which affords catalytic transformations of high selectivity by incorporation of a catalytic poison in the charge stream, said poison being a phosphorous organic compound of such molecular size and shape that it suppresses the activity of catalytic sites which produce undesired transformations while not appreciably affecting the catalytic activity of those sites which cause desired transformations.

In another embodiment, the present invention relates to a method for improving the selectivity of a catalytic process in which two or more differently shaped molecules ordinarily are transformed by contact with a solid that preferentially sorbs only some of the molcules charged to the process while excluding others. Such method involves contacting the solid with an organic phosphorous poison of such molecular shape that it is excluded from the internal pores of the solid, while simultaneously or subsequently contacting the solid with the charge undergoing transformation.

In still another embodiment, the invention described herein provides a process for selectively converting straight chain compounds only from a mixture of the same with branched chain compounds.

The present invention further embodies a continuous process wherein an undesirable component in a charge stream may be selectively converted to an innocuous transformed product.

It is contemplated that the selective conversion process described herein will be found useful in a wide variety of industrially important applications including the production and purification of numerous chemicals, the upgrading of hydrocarbon fuels, the selective dehydration of straight chain alcohols, from a mixture of the same with branched chain alcohols, the selective hydrogenation or oxidation of normal aliphatic compounds from a mixture of the same with iso-aliphatic or aromatic compounds, and the selective hydrocracking of normal aliphatic compounds from a mixture of the same with iso-aliphatic or aromatic compounds. As will be realized, different catalytic reactions and catalyst preparations will be suitable for specific embodiments of the invention. For example, isobutylene may be freed of straight chain butenes by selectively hydrogenating or oxidizing only the normal butene. Similarly, isoprene may be upgraded for polymerization by hydrogenating selectively the straight chain olefins and diolefins to the corresponding paraffins which are innocuous in the polymerization process. Utilizing the principles of the present invention normal ethers may be prepared in high purity by selective dehydration of normal alcohols. Olefins may be cracked to smaller olefin fragments with minimum formation of secondary reaction products, and normal butenes may be prepared by selective dehydrogenation of a butane-isobutane mixture without prior separation of the normal butane.

It is an essential feature of the invention that the solid porous contact material employed contain catalytically active sites so disposed that an effective number of the same occur in each of two categories. Such categories include sites which are contained internally within the pores of the solid and those which are on the outer external surface of the porous solid and accessible to at least one of the reactant or product species. By contacting the solid catalyst during or prior to the catalytic transformation with a phosphorus-containing organic compound of such molecular size and shape that only the accessible catalytic sites are available for contact with such compound, a catalytically inactive complex is formed and catalytic conversion is restricted to only those reactants and products capable of entering the pores of said solid and making contact with the internal catalytic sites.

Catalytic processes contemplated by the present invention may be considered to be of two classes. In the first class are those processes in which a single reactant is ordinarily transformed to desirable products over the two above categories of catalytic sites but the external accessible sites also cause some reactant or product to be catalytically convered in part to undesirable by-products accessible only to such sites. This class may be illustrated by the etherification of n-butyl alcohol as follows:

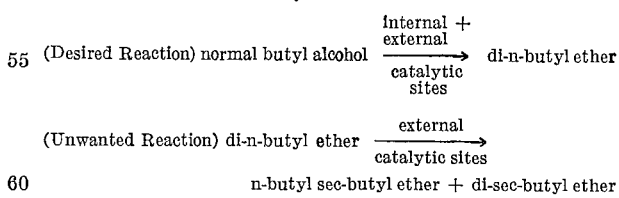

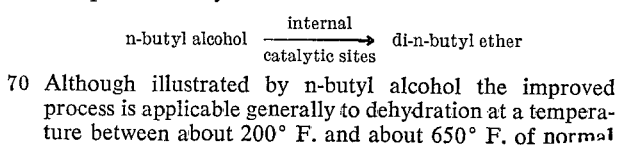

In accordance with the process of the invention, a phosphorous-containing organic compound not accessible to the internal catalytic sites inhibits the catalytic activity of the external sites, thus suppressing the undesired formaion of by-products. The thus improved catalytic process now produces only the desired reaction:

n-butyl alcohol $\xrightarrow[\text{catalytic sites}]{\text{internal}}$ di-n-butyl ether Although illustrated by n-butyl alcohol the improved process is applicable generally to dehydration at a temperature between about 200° F. and about 650° F. of normal alcohols which contain at least 3 and particularly 3 to 6 carbon atoms.

In the second class are processes in which the reactant charge is composed of at least two types of components, one of which is accessible, by reason of its size and shape, only to the external catalytic sites. This class may be illustrated by dehydrogenation of a mixture of normal aliphatic and iso-aliphatic hydrocarbons in accordance with the following equations:

(Desired Reaction) n-butane $\xrightarrow[\text{catalytic sites}]{\text{internal + external}}$ butene + H$_2$ (Unwanted Reaction) isobutane $\xrightarrow[\text{catalytic sites}]{\text{external}}$ isobutylene + H$_2$ Following the teachings of this invention, a phosphorous-containing organic compound accessible only to the external catalytic sites serves to suppress the unwanted reaction leaving only:

n-butane $\xrightarrow[\text{catalytic sites}]{\text{internal}}$ butene + H$_2$

Catalytic environments in which both of the above classes of reactions play a role obviously also benefit from the improved selective catalytic conversion process of the invention.

It will be evident from the foregoing that with the method of the invention, catalytic selectivity is achieved by establishing catalytic reaction systems in which catalytically active surfaces are located within the internal volume of porous solids having extremely uniform pore dimensions which are in such relation to the chemical species involved in catalytic reaction that only selected species are allowed to enter the pores of the solid structure, the other surfaces of such solid having been treated with an organic phosphorous compound incapable of entering such pores, and which inhibits the catalytic sites disposed on said outer surfaces.

The porous solids utilized herein as catalysts are those possessing a highly ordered uniform structure characterized by extremely uniform pores such that only reactant or product molecules of predetermined shape may be transported into and out of the porous structure. The porous solid catalyst utilized is further essentially characterized by external sites disposed on the outer surface of said solid and internal sites located on the interior of said solid, all of which sites are active catalytically in effecting transformation of at least one of the reactants or products of the charge brought into contact therewith. Generally, catalysts will be employed having uniform effective pores smaller than about 25 and preferably less than 15 Angstroms in diameter. Solids having pores in excess of about 25 Angstroms in diameter do not exhibit the requisite molecular size selectivity critical to the success of the method described herein. Thus, it will be understood that a molecular size selective catalyst is employed in the present process. By this term, as utilized herein, is meant a solid having pores of such dimension that only molecules having that dimension or smaller can gain entry to the internal catalytic sites, thus excluding molecules unable to traverse the pores from reaction participation. The crystalline aluminosilicates known as molecular sieves are representative examples of such molecular size selective catalysts.

Molecular sieves have heretofore been described in the literature and are essentially the dehydrated forms of crystalline natural or synthetic hydrous siliceous zeolites containing varying quantities of sodium, calcium and aluminum with or without other metals. All or a portion of the sodium or calcium ions normally contained in the molecular sieve structure may be zeolitically replaced with a number of various other ions. The atoms of sodium, calcium or metals in replacement thereof, silicon, aluminum and oxygen in these zeolites are arranged, in the form of an aluminosilicate salt in a definite and consistent crystalline pattern. This structure contains a large number of small cavities, interconnected by a number of small holes or channels. These cavities and channels are precisely uniform in size. Chemically, these zeolites may be represented by the general formula:

$$Me_{x/n}[(AlO_2)_x(SiO_2)_y] \cdot zH_2O$$

where Me is a metal cation, $x/n$ is the number of exchangeable cations of valence $n$, $x$ is also the number of aluminum atoms combined in the form of aluminate, $y$ is the number of silicon atoms and $z$ is the number of water molecules, removal of which produces the characteristic channel system. In the above formula, the ratio $y/x$ is a number from 1 to 5 and usually from 1 to 2. At the present time, there are commercially available molecular sieves of the "A" series and of the "X" series. The nature and preparation of these zeolites have been described in detail respectively in U.S. 2,882,243 and U.S. 2,882,244. Briefly, a synthetic zeolite known as "Molecular Sieve 4A" is a crystalline sodium aluminosilicate having channels about 4 angstroms in diameter. In the hydrated form, this material is chemically characterized by the formula:

$$Na_{12}(AlO_2)_{12}(SiO_2)_{12} \cdot 27H_2O$$

The synthetic zeolite known as "Molecular Sieve 5A" is a crystalline aluminosilicate salt having channels about 5 angstroms in diameter and in which substantially all of the 12 ions of sodium in the immediately above formula are replaced by calcium, it being understood that calcium replaces sodium in the ratio of one calcium ion for two sodium ions. A crystalline sodium aluminosilicate is also available commercially under the name of "Molecular Sieve 13X." The letter "X" is used to distinguish the inter-atomic structure of this zeolite from that of the "A" crystal mentioned above. As prepared, the 13X material contains water and has the unit cell formula $$Na_{86}[(AlO_2)_{86}(SiO_2)_{106}] \cdot 267H_2O$$

The parent zeolite is dehydrated to make the active catalyst. The synthetic zeolite known as "Molecular Sieve 10X" is a crystalline aluminosilicate salt in which a substantial proportion of the sodium ions of the 13X material have been replaced by calcium. In addition to the synthetic A and X type zeolites, other synthetic zeolites described in the literature as well as natural zeolites including, for example, chabazite, mordenite, analcite, lebrynite, gmelinite and natrolite may be effectively utilized in the method of the invention.

Catalytically active materials may be introduced into the crystal lattice by initially contacting the zeolitic solids with solutions containing catalytically active components. In this manner, a catalytically active element can be introduced by deposition of the incoming metal on the zeolitic solid after drying of the solution from the crystalline carrier. Often, establishment of catalytic centers can be effectively achieved by exchanging a portion of the original metal ion of the zeolite with an ion exhibiting catalytic activity for the desired conversion. Thus, for example, a portion of the sodium or calcium ions normally contained in the molecular sieve structure may be zeolitically replaced with a number of various other ions such as silver, copper, aluminum, hydrogen, zinc, strontium, cobalt, gold, potassium, platinum, nickel, ammonium, cadium, mercury, lithium, magnesium, lanthanum, cerium and other rare earth metals. Replacement is suitably accomplished by contacting the molecular sieve with a solution of an ionizable compound of the ion which is to be zeolitically introduced into the molecular sieve structure for a sufficient time to bring about the extent of desired introduction of such ion. After such treatment, the molecular sieve is water washed and calcined and thereafter is ready for use.

In some instances, it may be desired to use a platinum metal containing zeolite resulting from growth of the crystalline structure in the presence of a solution containing platinum metal ions. The preparation of such materials is described in detail in copending patent application Ser. No. 319,639 filed Oct. 29, 1963, now U.S. Pat. 3,373,109. In other instances it may be desired to use as the internal catalytically active species an intrinsic catalytic activity possessed by the zeolite itself. In copending application Ser. No. 763,433 filed Sept. 26, 1958, now U.S. Pat. 3,514,832, there are described some types of chemical activities which have been discovered to be possessed by some of the zeolite materials.

It will be understood that the size selective catalyst component may be either utilized by itself or in combination with other solids. Thus, the size selective component may be intimately combined with and dispersed in a suitable matrix such as, for example, an inorganic oxide gel. Likewise, the internal and external catalytic sites may be located on different catalyst particles. For example, composites of molecular sieves and catalytically active clays are contemplated for use in the present process, even though one component by itself, i.e. the clay does not exhibit internal selective catalytic sites and consequently shows no selectivity in the absence of the molecular sieve component.

The catalytic poisons useful in the present process are those organic phosphorous compounds possessing a sufficiently large molecular shape to be excluded from contact with the internal catalytic sites contained in the pore structure. In addition, it is desirable that the complex of the poison formed upon contact with the external catalytic sites disposed on the outer surface of the porous solid be stable under the conditions at which reaction is carried out. Further, the poisoning compound utilized should be such that it should neither react with the charge materials nor possess catalytic activity contrary to the purpose for its use. The volatility and stability of the poison compound moreover, should be sufficiently low to prevent its elution from the catalyst under conditions employed for the catalyzed reaction.

Suitable organic phosphorous compounds useful as poisoning media for the external catalytic sites of the catalytic compositions employed herein, include organic, and particularly cyclic phosphates, phosphites, phosphonates, phosphonites, and phosphines. Typical of such compounds are the dibenzylphosphates, dibenzylphosphites, dibutylphenyphosphonites, diphenyl methylphosphates, diphenyl phenylphosphonites, diphenyl phosphites, dicresyl phosphites, ethylene (bis) diphenyl phosphines, ethylene (bis) diphenyl phosphine oxides, naphthyl phosphates, triphenyl phosphines, triphenyl phosphine oxides, triphenyl phosphates, triphenyl phosphites, tri(dimethylphenyl) phosphates, and tri cresyl phosphates.

The particular catalytic poison employed depends on the pore size characteristics of the solid porous catalyst present. For catalysts having pores of about 5 angstroms in diameter, such as the 5A Molecular Sieve, useful poisons include, organic phosphorous compounds which are excluded from entering such size pores and making contact with the internal catalytic sites contained therein. Transition metal-containing catalysts having a structure of the 5A Molecular Sieve with transition metal present on the external surface of the crystalline structure as well as within the pores thereof, are increased in selectivity by utilizing phosphorus-containing compounds such as tricresyl-phosphate as the catalytic poison. With solid catalysts having internal catalytic sites accessible to fairly large molecules, the catalytic poisons must be sufficiently large to be excluded from these sites.

The amount of catalytic poison employed will depend on its relative effectiveness. Thus, strongly chemisorbed materials need be present at only extremely low levels, and may persist in effectiveness long after initial contact with the catalyst. Weakly chemisorbed poisons are generally needed at substantially greater levels, and it may be desirable to introduce such materials continuously into the charge stock to maintain effective action. Ordinarily, the amount of poison added is sufficient to inhibit the activity of the external catalytic sites, and usually is within the approximate range of 0.01 to 10 weight percent of the charge stock, or between about 1 and 10 weight percent based on the catalyst.

Poisoning of the catalyst may be accomplished by addition of the organic phosphorous-containing poison compound to the charge stream prior to contacting with the catalyst. Alternatively, it may be desirable to contact the catalyst with a suitable poisoning compound prior to bringing the same into contact with the charge stock. In some instances, it may be feasible to contact the catalyst simultaneously with the poisoning compound, and the charge stock. When the catalyst is pretreated with the poisoning compound, such is generally accomplished by contacting particles of the catalyst with the poisoning material or a suitable solution containing an amount of such material sufficient to poison the exterior catalytic sites of the catalyst. The particles are thereafter removed from contact with excess poisoning material or solution thereof, and subjected to a drying operation during which the solvent of the solution, if such was used, is evaporated.

The following examples will serve to illustrate the process of the invention without limiting the same:

EXAMPLE 1

A 2 cc. sample of 5A molecular sieve zeolite containing 0.32 weight percent platinum distributed on both exterior and interior surfaces was soaked in a suitable container for 10 minutes in 3 cc. of methylcyclopentane containing 10 drops of tricresyl phosphate. The container was placed in a hot bath to vaporize the solvent methylcyclopentane. The treated catalyst was then dried at about 240° F. As will be evident, neither the solvent nor the tricresyl phosphate poison are of such size or shape as to pass through the pores of the zeolite.

A reactor was charged with 0.15 gram of the above catalyst and purged continuously with helium. A pulse containing hydrocarbon, as hereinafter indicated, and helium with an excess of oxygen was introduced into the carrier gas stream of a chromatographic unit at 315 vapor hourly space velocity at atmospheric pressure. All products obtained were immediately analyzed. At 580° F. the conversion to $CO_2$ for n-butane was 18 weight percent as compared with only 4 weight percent for isobutane. At 500° F. or less there was no combustion of isobutane; n-butane conversion being still about 5 percent at 422° F. as will be seen from Table I below wherein the results obtained are compared with those realized utilizing a corresponding nutreated 5A molecular sieve containing the platinum:

TABLE I

| ° F. | Hydrocarbon | Pt/5A, wt. percent combustion | Pt/5A+ tricresyl phosphate, wt. percent combustion |
|---|---|---|---|
| 422 | iC4 | | 0 |
|  | nC4 | | 5.2 |
| 484 | nC4 | | 6.9 |
| 500 | iC4 | 61.7 | 0 |
|  | nC4 | 51.8 | |
| 540 | nC4 | | 11.0 |
| 630 | iC4 | | 13 |
|  | nC4 | | 22 |
| 635 | iC4 | 65.4 | |
|  | nC4 | 60.5 | |

EXAMPLE 2

The catalyst of Example 1 which had undergone treatment with tricresylphosphate was introduced into a reactor as in the preceding example and flushed continuously with 60 cc./min. of hydrogen, the carrier gas stream of a chromatographic unit. Vapor samples of 0.05 cc. butene-1 and isobutene were injected into the stream being introduced into the reactor and all products were analyzed. At 340° F. butene-1 produced 42 percent n-butane and 58 percent butene isomers, while only 12 percent of the isobutene was converted to isobutane. At 197° F. conversion of butene-1 decreased to 6 percent while the conversion of isobutene was less than 1 percent as will be seen from Table II below:

TABLE II

| Temp., °F. | Charge | Product distribution | | | |
|---|---|---|---|---|---|
| | | n-Butane | Butene isomers | i-Butane | i-Butene |
| 197 | Isobutene | | | 0.5 | 99.5 |
| | Butene-1 | 6.5 | 93.5 | | |
| 270 | Isobutene | | | 4.4 | 95.6 |
| | Butene-1 | 21 | 89 | | |
| 340 | Isobutene | | | 12 | 88 |
| | Butene-1 | 41.5 | 58.5 | | |

EXAMPLE 3

A one milliliter sample of a 5A aluminosilicate which had been loaded non-selectively with 0.32 weight percent platinum was placed in a microreactor and dried at 700° F. in a stream of helium. It was then cooled to room temperature and treated with a solution of 5 drops of tricresyl phosphate in 5 milliliters of methylcyclopentane. The solvent, i.e. methylcyclopentane, was boiled off in a hydrogen stream while heating to a temperature of 662° F.

The aluminosilicate catalyst was then subjected to 60 ml./min. flow of hydrogen saturated with n-octane for 18 minutes. The flow rate was then decreased to 10 ml./min. The product stream was sampled at 27 minutes on stream, and analyzed by gas chromatography. The catalyst was reactivated with hydrogen and then contacted with a 10 ml./min. stream of hydrogen saturated with isooctane. The product stream was sampled at 5 minutes. Conversion to hydrocracked products was 4.7 weight percent utilizing the isooctane charge as contrasted with a conversion of 9 weight percent obtained with the normal octane charge. These results illustrate the selective conversion achieved with normal aliphatic charge stock in accordance with the process of the invention. Ordinarily isooctane cracks more easily than normal octane.

This invention teaches general methods for converting chemical substances catalytically under conditions which impose selectivity of reaction paths by virtue of providing catalytically active sites within porous solids, the interstitial dimensions of which will selectively pass or reject certain molecules. It teaches the use of this principle for selecting specific reactants from mixtures thereof, as well as for directing a reaction towards net production of only specific species.

The samples given above illustrate the methods of the invention, as well as define specific embodiments contemplated. Thus, there has been shown application to selective oxidation of normal paraffin hydrocarbons from a mixture of the same with isoparaffin hydrocarbons. There has also been shown selective hydrogenation of normal aliphatic compounds from a mixture of the same with iso-aliphatic compounds. In addition, there has been shown selective hydrocracking of normal aliphatic compounds in preference to iso-aliphatic compounds.

The application of the invention for size selective conversion of certain organic compounds of limited size has been demonstrated. The same size selective conversion method may be applied to other embodiments of organic compounds where it is desired to selectively convert acetylenic, olefinic or aromatic bonds in compounds which have a molecular size smaller than approximately 10 angstrom units with relatively little effect on other components of larger molecular size. For example, alkylbenzene may be selectively hydrogenated or oxidized in the presence of alkylnaphthalene. By use of a porous crystalline aluminosilicate having uniformly sized pores of about 5 angstrom units as the carrier, for conversion activity, the ability to obtain specific conversion reactions of straight chain olefins in admixture with branched chain olefins has been noted. The method is applicable to acetylenic or diolefinic structures. For example, normal butylene may be converted from a mixture of isobutylene. Such a step of selective catalyst conversion is often useful in place of a non-chemical process of separation. Thus, the selective conversion of normal butylene in contrast to isobutylene may be practiced preparatory to hydration of a butylene stream for the purpose of preparing tertiary butanol. The same principle may be applied to selective hydrogenation of organic compounds other than hydrocarbons, as for example with the selective reduction of aldehydes to primary alcohols from a mixture of aldehydes and ketones.

It is contemplated that the selective catalytic conversion process described herein may be carried out either as a batch process, or as a continuous operation wherein the charge is continuously conducted through a bed of the size selective catalyst, the outer surfaces of which have been catalytically poisoned with an organic phosphorous compound. The product resulting from such conversion is continuously withdrawn from the catalyst bed. The method described herein is particularly applicable to a continuous operation, and such mode of operation accordingly represents a preferred aspect of the invention.

It will be understood that the above description is merely illustrative of preferred embodiments of the invention to which many variations may be made by those skilled in the art, without departing from the spirit thereof.

What is claimed is:

1. A method for selectively conducting a chemical reaction which comprises bringing a charge stock into contact in a conversion zone, with a porous solid having a highly ordered structure with uniformly sized pores, such that only reactant and product molecules of predetermined size and shape may be transported in either direction between the interior phase and the exterior phase, said porous solid having catalytic sites located within the interior thereof, active with reference to at least one component of said charge capable of entering said pores, the external exposed surface of said solid having been poisoned before substantial conversion of said charge is encountered with an organic phosphorous compound of such molecular size and shape as to be excluded from entering said pores and making contact with active catalytic sites on the interior of said porous solid; catalytically converting said component to chemically distinct species capable of passing from the interior of said solid and effecting withdrawal of the resulting converted product from said conversion zone.

2. The method of claim 1, wherein the porous solid is a crystalline aluminosilicate molecular sieve material.

3. The method of claim 2, wherein the crystalline molecular sieve material, is characterized by uniformly sized pores of approximately 5 angstroms in diameter.

4. The method of claim 1, wherein the reaction involves selective oxidation.

5. The method of claim 1, wherein the reaction involves selective hydrogenation.

6. The method of claim 1, wherein the reaction involves selective hydrocracking.

7. The method of claim 1, wherein the charge is a mixture of normal paraffin and isoparaffin hydrocarbons, and the component admitted to contact with the active catalytic sites on the interior of the porous solid, is the normal paraffin hydrocarbon.

8. The method of claim 1, wherein the charge is a mixture of normal olefin and iso-olefin hydrocarbons, and the component admitted to contact with the active catalytic sites on the interior of the porous solid, is the normal olefin hydrocarbon.

9. The method of claim 1, wherein the organic phosphorous compound is tricresylphosphate.

10. The method of claim 1, wherein the porous solid has catalytic sites located within the interior thereof, attributable to platinum.

11. A process for preparing a shape selective conversion catalyst which comprises contacting a porous solid, having a highly ordered structure with uniformly sized pores, such that only reactant and product molecules of predetermined size and shape may be transported in either direction between the interior phase and the exterior phase, said porous solid having catalytic sites located within the interior thereof, active with reference to at least one component of a charge stock capable of entering said pores, with an organic phosphorous compound of such molecular size and shape as to be excluded from entering said pores and making contact with active catalytic sites on the interior of said porous solid so that the external exposed surface of said solid is resultingly poisoned thereby.

12. A process according to claim 11 wherein said porous solid is a crystalline aluminosilicate molecular sieve material.

13. A process according to claim 11 wherein said crystalline aluminosilicate is characterized by uniformly sized pores of approximately 5 angstroms in diameter.

14. A process according to claim 11 wherein said organic phosphorous compound is tricresylphosphate.

15. The shape selective conversion catalyst produced by the process of claim 11.

16. The shape selective conversion catalyst produced by the process of claim 12.

17. The shape selective conversion catalyst produced by the process of claim 13.

18. The shape selective conversion catalyst produced by the process of claim 14.

19. The shape selective conversion catalyst produced by the process of claim 11 wherein the porous solid has catalytic sites located within the interior thereof, attributable to platinum.

References Cited

UNITED STATES PATENTS

| | | | |
|---|---|---|---|
| 3,144,415 | 8/1964 | Silverman | 208—114 |
| 3,437,587 | 4/1969 | Ellert et al. | 208—120 |

OTHER REFERENCES

Catalysis, Inorganic and Organic by Barkman et al., Reinhold Pub. Corp., New York, N.Y., pp. 393–396 (1940).

DELBERT E. GANTZ, Primary Examiner

R. BRUSKIN, Assistant Examiner

U.S. Cl. X.R.

208—143; 252—437, 455; 260—687